Figure 1:
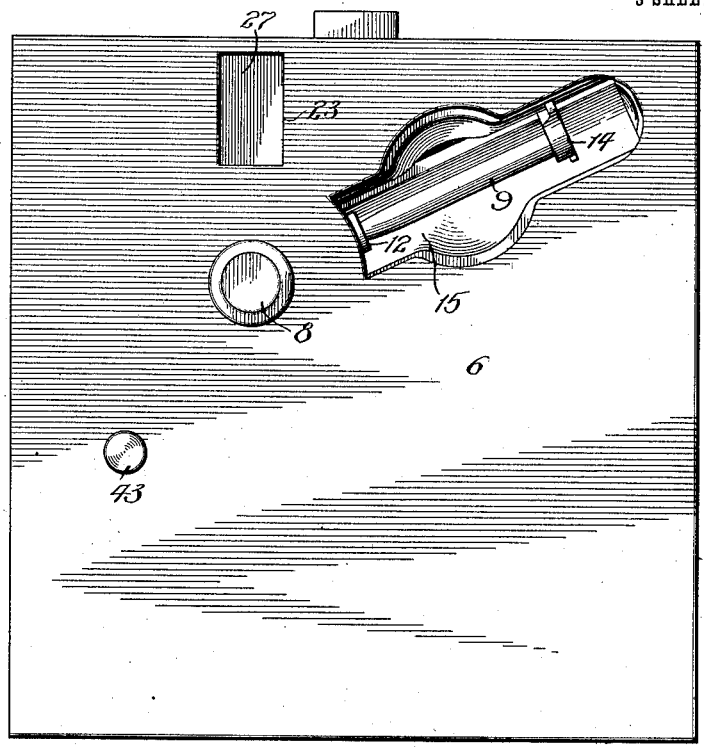

C. P. BEERS, F. C. RANDALL & E. V. WHITON.
APPARATUS FOR FILLING FOUNTAIN PENS.
APPLICATION FILED JUNE 8, 1910.

1,003,169.

Patented Sept. 12, 1911.

3 SHEETS—SHEET 1.

C. P. BEERS, F. C. RANDALL & E. V. WHITON.
APPARATUS FOR FILLING FOUNTAIN PENS.
APPLICATION FILED JUNE 8, 1910.
1,003,169.
Patented Sept. 12, 1911.
3 SHEETS—SHEET 2.
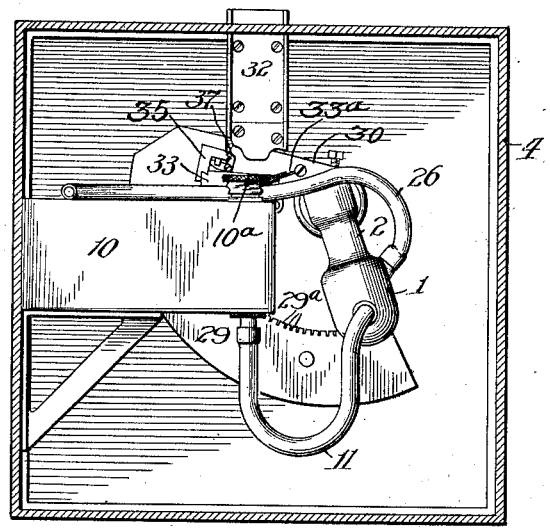
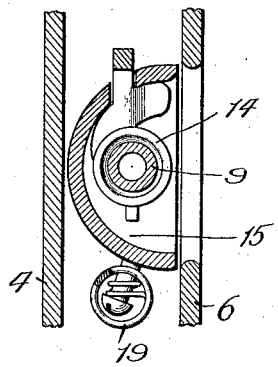
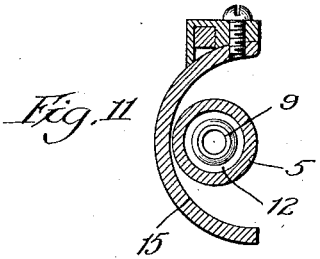
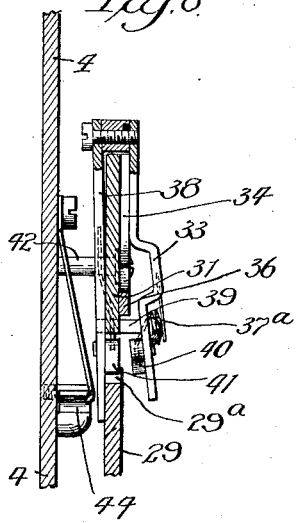
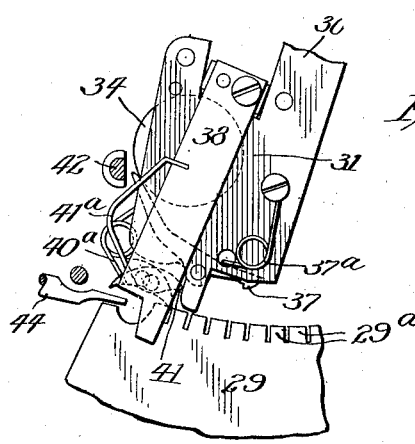
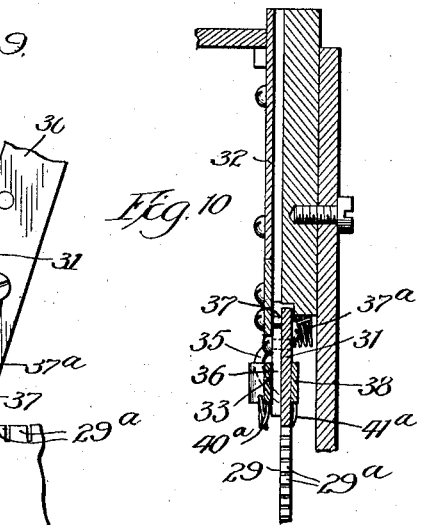
Witnesses:
Inventors:
C. P. Beers
F. C. Randall
E. V. Whiton
By Barton & Fok, Attys

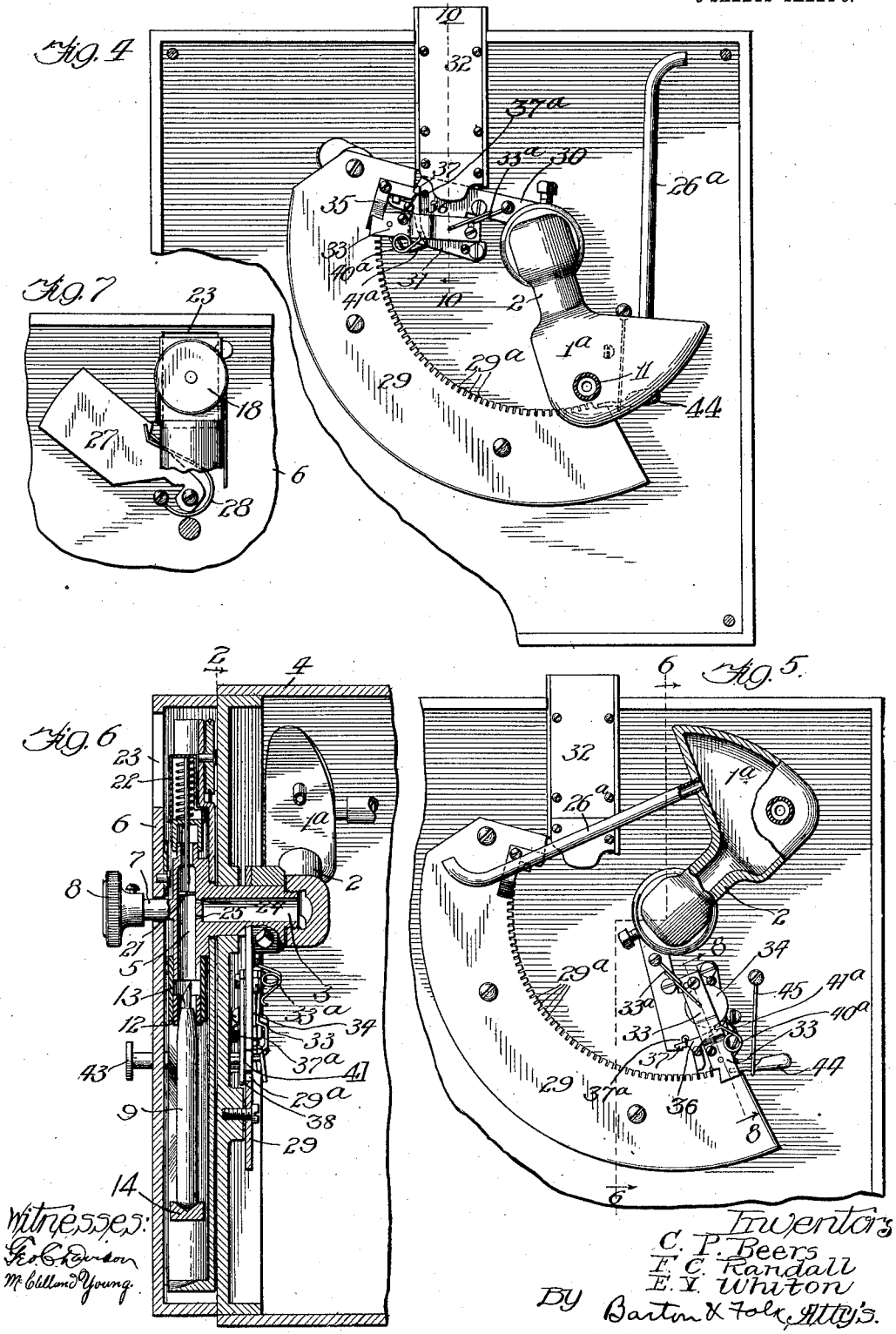

UNITED STATES PATENT OFFICE.

CLARENCE P. BEERS, FREMONT C. RANDALL, AND EDWARD V. WHITON, OF JANES-
VILLE, WISCONSIN; SAID RANDALL ASSIGNOR TO SAID BEERS AND WHITON.

APPARATUS FOR FILLING FOUNTAIN-PENS.

1,003,169.   Specification of Letters Patent.   Patented Sept. 12, 1911.

Application filed June 8, 1910. Serial No. 565,716.

*To all whom it may concern:*

Be it known that we, CLARENCE P. BEERS, FREMONT C. RANDALL, and EDWARD V. WHITON, citizens of the United States, residing at Janesville, in the county of Rock and State of Wisconsin, have invented a certain new and useful Improvement in Apparatus for Filling Fountain-Pens, of which the following is a full, clear, concise, and exact description.

Our invention relates to apparatus for filling fountain pens or the like, and its object is to provide mechanism by which a measured amount of ink is delivered from the apparatus and is introduced into the barrel of the pen through the opening about the pen point, rendering it unnecessary to unscrew the nozzle of the pen.

One feature of our invention consists of a measuring vessel or measure and means whereby said measure is inverted to release the contents thereof, and means whereby the liberated contents may be forced into the barrel of the pen. More specifically, the measure is carried upon the end of a crank, whereby it may be swung in the arc of a circle and thus inverted. The swinging or movable measure is preferably connected to a fixed ink-supply or reservoir by means of a flexible supply tube and the measure preferably holds a limited or predetermined amount of ink sufficient to fill the barrel of an ordinary pen.

Another feature of our invention consists in providing the measure with an air vent in order to prevent a siphoning action between the reservoir and the measure, when ink is being drawn from the measure.

Another feature of our invention consists of a feed tube which conducts the ink from the measure to the fountain pen, said feed tube preferably having the form of a T-pipe, the body of the T communicating with a movable tank and the cross arms thereof having a piston mounted therein for reciprocation.

Another feature of our invention consists of means for holding the pen in place, and means for making the recovery of the pen after it has been filled dependent upon the restoration of the mechanism to its normal condition.

Another feature of our invention consists of the segmental rack and the pawls engaging therewith to control the swinging movement of the measure.

Another feature of our invention consists in an arrangement whereby a reciprocating piston alternately withdraws air from the barrel of the fountain pen, thereby producing a partial vacuum in the barrel, and then forces ink thereinto under compression and drives out the air remaining in the barrel.

These and other features may be more readily understood by reference to the accompanying drawings, in which—

Figure 2:
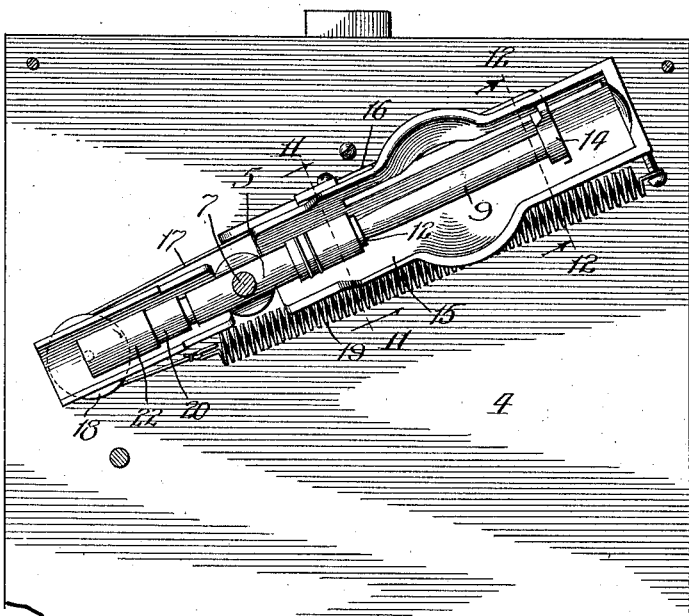

Figure 1 is a front elevation of a machine embodying our invention; Fig. 2 is a similar view with the front plate thereof removed; Fig. 3 is a rear elevation, with the wall of the casing in section, showing the interior mechanism in its normal position; Fig. 4 is a rear elevation with the walls of the casing and the ink reservoir removed to more clearly show the coin-controlled mechanism; Fig. 5 is a view similar to Fig. 4, showing the measuring tank swung into its inverted position; Fig. 6 is a section on the line 6—6 of Fig. 5; Fig. 7 is a detail view in rear elevation of a portion of the casing which contains the opening for giving access to the reciprocating piston; Fig. 8 is an enlarged, vertical section on the line 8—8 of Fig. 5; Fig. 9 is an enlarged, fragmentary view in front elevation; Fig. 10 is a vertical section on the line 10—10 of Fig. 4; and Figs. 11 and 12 are sections on the line 11—11 and 12—12 of Fig. 2.

Similar letters of reference refer to similar parts throughout the several views.

Referring more particularly to Figs. 3 to 6, inclusive, the measuring vessel or measure is shown as consisting of a hollow body 1 (Fig. 3) or 1ᵃ (Figs. 4, 5 and 6), having a tubular portion or neck 2, threaded or otherwise secured upon one end of the tubular section 3 of a T-pipe. Such section 3 is journaled in the front wall of the casing 4. The cross member 5 of the T-pipe lies upon the outer front wall of the casing. Secured upon the front wall of the casing and spaced apart therefrom is a face plate 6. Said face plate is provided with an opening through which a spindle 7 of the T-pipe extends. Said spindle 7 is provided with a knob or handle 8 by means of which the T-pipe may be rotated, thus swinging the measure 1 or 1ᵃ to invert the same and thereby to liberate the contents of the measure into the T-pipe. The sections 3 and 5 of the pipe constitute a feed-tube leading to the fountain pen or other similar device 9.

Mounted upon the side wall of the casing 4 is a fixed ink-supply reservoir 10. A flexible pipe 11 of rubber or other suitable material extends from the bottom of the reservoir 10 to the measure. The measure normally lies below the level of the ink in the reservoir 10, and hence when said measure is in its lowermost position, it is filled with ink which flows from the reservoir 10 through the flexible pipe 11. When the measure is swung into its inverted position, it is carried above the level of the ink in the reservoir. The reservoir 10 is provided with an inlet 10ª for the introduction of ink, which inlet may also serve as an air vent to insure a flow of ink from the reservoir.

In the normal or lowermost position of the measure, the branch 5 of the T-pipe extends downwardly across the front face of the casing 4, as shown most clearly in Fig. 2. A mouth piece 12 of rubber or other suitable material is secured by a sleeve 13 to the upper end of said tube. Said mouth piece receives the point of the pen 9 and forms an air tight joint therewith. The opposite end of the pen 9 is seated in a spring-pressed block 14, the pen being thereby thrust and held into a close fitting engagement with the mouth piece 12.

Secured upon the tube 3 and mounted to rotate therewith is a trough-shaped member 15 in which the tube 5 and the pen 9 lie. The member 15 is enlarged or bowed out about midway of the pen 9 in order that access to the pen may be more readily had. One of the walls of the trough 15 is slotted to receive the shank 16 which extends at a right angle from the holder 14. The outer end of the shank 16 has secured thereto a cord 17 which extends over a pulley 18 mounted upon the lower end of the trough 15. The opposite end of the cord 17 is secured to a coiled spring 19. The block 14 is thus yieldingly pressed toward the mouth piece 12 and the pen is readily inserted and is then securely held in position.

The lower end of the tube 5 is closed by a cap 20 through which extends the rod of a piston 21, which reciprocates in the tube 5. A shell 22 is telescopically mounted upon the end of the cap 20 and is normally spring-pressed in its outermost position. The stem of the piston 21 is secured to the shell 22, and hence the piston may be reciprocated by the alternately pressing down upon and releasing the shell 22.

As shown in Fig. 1, the cover plate 6 is cut away at the upper corner thereof in order that access may be had to the pen holding mechanism in the normal or initial position of the apparatus. By turning the knob 8, the ink measure 1 or 1ª is swung to its inverted position and the pen 9 is simultaneously carried to a vertical position, as shown in Fig. 6, so that there is a tendency of the ink to flow by gravity from the measure into the barrel of the pen. In this position of the mechanism, the shell 22 of the reciprocating piston is immediately back of an opening 23 in the cover plate 6 and is thereby rendered accessible for manipulation.

The tube 3 opens into the tube 5 preferably through two small openings 24, 25, the latter being provided for the flow of the ink into the tube 5, and the former for the outflow of air. In the upward stroke of the piston 21, a partial vacuum is created in the lower end of the tube 5 and in the barrel of the pen 9, thus introducing a flow of ink into the tube 5. Upon the downward stroke of the piston head 21, the ink in the tube 5 is forced into the barrel 9, thus compressing or expelling the air therefrom. The expelled air escapes around the sides of the piston 21. By thus reciprocating the piston 21, the ink is drawn through the opening 25 and is forced into the barrel of the pen, the expelled air finding an outlet through the opening 24.

It will be noted that, although the measure 1 or 1ª in its inverted position extends above the level of the ink in the reservoir 10, the operation of the reciprocating piston 21 is such as would produce a siphoning action between the reservoir 10 and the measuring vessel if the latter is closed against the access of air thereto. For this reason we provide an air inlet to the measure. This air inlet is preferably in the form of a flexible tube 26 which extends from the measure to a point above the reservoir 10, as for example, it may lie upon the top of the tank 10. (See Fig. 3.) Since the tube 26 extends above the level of the ink in the reservoir 10, ink cannot escape through the same, whatever may be the position of the measure. When the measure is inverted and the ink is drawn therefrom, the air inlet through the pipe 26 prevents a vacuum being created in the measure 1, and hence prevents the ink from being siphoned from the tank 10 into the measure 1. Instead of a flexible tube 26, a metal tube 26ª may be provided, the upper end of said tube extending above the level of the ink in the tank 10 when the measure is in its lowermost position. (See Fig. 4.)

The opening 23 in the face plate 6 is preferably provided with a shutter 27 which normally closes the same, said shutter being held in its closed position by a spring 28 (see Fig. 7). When the handle 8 is rotated to invert the measure, the trough 15 engages the shutter 27 and pushes the same to one side against the tension of the spring 28.

The piston is then accessible, through the opening 23, for manipulation.

The operation of the mechanism to fill the pen is preferably made dependent upon the deposit of a coin or other token. With this object in view, there is mounted upon the inner front wall of the casing 4 an arc-shaped or segmental rack 29, having the axis of rotation of the measure as its center. Secured upon the tubular spindle 3 is an arm 30 for carrying pawls 40, 41 and which are adapted alternately to engage with the teeth 29$^a$ of the segmental rack. At its outer end, the arm 30 is expanded into a plate 31 which, in the normal position of the measure, lies immediately below a coin chute 32.

Pivoted upon the arm 30, and pressed by the spring 33$^a$ toward the plate 31, is a lever 33 adapted to clamp a coin or token 34 against the plate 31. In the normal or initial position of the mechanism, a cam 35, provided at the upper end of the segmental rack 29, serves to space the lever 33 a sufficient distance from the plate 31 to permit a coin deposited in the coin chute 32 to fall between the said plate and lever. The plate 31 carries a dog 36, the head 37 of which is normally pressed by a spring 37$^a$ into engagement with a projection of the segmental rack 29 and locks the mechanism against rotation. In the initial position of the rotary mechanism, a coin deposited in the chute 32 falls into a pocket between the lever 33 and the plate 31 and the weight of the coin bears against the lower end of the dog 36, releasing the head 37 from its locked engagement with the rack, and thereby releases the rotary mechanism.

Upon the side of the plate 31 opposite the lever 33, is a lever 38 connected by a pin 39 to move with the lever 33. The outer ends of the levers 33 and 38 extend upon opposite sides of the segmental rack 29. Pivoted near the ends of the levers 33 and 38 are pawls 40 and 41, respectively, arranged for alternative engagement with the teeth 29$^a$. The springs 40$^a$ and 41$^a$ serve to press the pawls 40 and 41, respectively, into yielding engagement with the teeth 29$^a$. The pawl 41 is so pivoted that in rotating the measure to invert the same, said pawl rides freely over the teeth 29$^a$, but, when in line with said teeth, prevents a reversed rotation of the parts. The pawl 40 is oppositely arranged to the pawl 41, and, when brought into alinement with the teeth 29$^a$, rides freely over said teeth during the return of the measure from its inverted to its normal position, but permits a rotation of the mechanism in the one direction only.

The operation of the coin-controlled mechanism thus far described is as follows: A suitable coin deposited in the chute 32, when the parts are in the position shown in Fig. 4, falls into the pocket between the plate 31 and the lever 33 and by its weight will release the dog 37. The rotary mechanism can then be operated through the medium of the knob 8. Meanwhile, the coin which is clamped against the plate by the spring-pressed lever 33 holds the pawl 40 out of line with the teeth 29$^a$ and brings the pawl 41 into line therewith. This permits of the rotation of the measure from its normal to its inverted position, but prevents rotation in opposite direction. This rotary movement can be continued until the plate 31 comes in contact with the stop pin 42, in which position of the parts the reciprocating piston is accessible through the opening 23, as shown in Fig. 6, and the fountain pen 9 can be filled with ink in the manner heretofore described. Owing to the fact that the pawl 41 is in engagement with the teeth 29$^a$, the knob 8 can not be turned to bring the mechanism to its original position until the coin 34 shall have been released. For this latter purpose we provide on the outer face of the cover plate 6 a plunger 43 which extends through the cover plate 6 and the front wall of the casing 4 and is provided on its inner end with an angular extension 44 projecting beneath the end of the lever 33, when the measure is in the inverted position shown in Fig. 5. The plunger 43 is normally pressed outward by a spring 45 which bears against the extension 44. By pushing in on the plunger 43, the extension 44 engages the lever 33 and releases the coin 34 which thereupon falls to the bottom of the casing. When the plunger 43 returns to its normal position, the pressure of the spring 33$^a$ causes the lever 33 to bear against the plate 31, throwing the pawl 41 to one side of the teeth 29$^a$ and bringing the pawl 40 into engagement with said teeth. The pawl 40 now rides freely over the teeth 29$^a$ during the rotation of the knob 8 in a direction to restore the parts to their initial positions. The pen is thus brought into position where it can be taken out through the opening in the face plate 6.

It will be noted that the piston by forcing ink through the feed-tube of the pen in addition to filling the pen cleans the same. It will also be understood that the apparatus of our invention is adapted to fill writing devices other than fountain pens.

While we have shown and described suitable mechanism embodying our invention, we do not wish to be understood as limiting the same to the specific mechanism shown, as the structural details of our invention may be varied within the scope of the appended claims.

What we claim is:

1. In an apparatus for filling fountain pens, the combination with a casing, of a tubular crank-shaft journaled in said casing, a vessel for holding ink mounted upon said shaft within said casing, said vessel having an outlet communicating with one end of said tubular shaft, an upwardly extending mouthpiece carried upon the opposite end of said tubular shaft for receiving the point of a fountain pen, said mouthpiece being mounted to rotate with said shaft, means for rotating said shaft to invert said vessel and said mouthpiece, and means for forcing the ink liberated from the inverted vessel into the barrel of said pen.

2. In an apparatus for filling fountain pens, the combination with a fixed ink-reservoir, of a movable ink measure, a flexible supply tube connecting said measure to said reservoir, an outlet tube for said measure, said outlet tube being provided with an upwardly extending mouthpiece for receiving the point of a fountain pen, means for inverting said mouthpiece and for moving said measure to liberate the contents thereof through said outlet tube, and means for forcing the liberated ink into the barrel of said fountain pen.

3. In an apparatus for filling fountain pens, the combination with a tubular crank shaft, a vessel for holding ink mounted upon one end of said shaft, said vessel having an outlet communicating with the tubular shaft, an upwardly extending mouthpiece carried upon the opposite end of said crank shaft for receiving the point of the fountain pen, said mouthpiece being mounted to rotate with said shaft, a fixed ink-reservoir, a flexible supply-tube connecting said vessel with said reservoir, means for rotating said crank shaft to invert said vessel and said mouthpiece, and a piston for pumping the ink from said vessel into the barrel of said pen.

4. In an apparatus for filling fountain pens, the combination with a fixed reservoir for holding ink, of a swinging ink-measure provided with an air-vent opening above the level of ink in said reservoir, a flexible supply tube connecting said ink-measure to said fixed reservoir, an outlet tube from said ink-measure, said latter tube being provided with a mouthpiece adapted to receive the point of a fountain pen, means for swinging said ink-measure to release the contents thereof through said outlet tube, and means for forcing the liberated ink into the barrel of said pen.

5. In an apparatus for filling fountain pens, the combination with a T-pipe, of a bearing in which the body portion of said T-pipe is journaled to rotate, a vessel for holding ink mounted upon the inner end of said T-pipe and provided with an outlet communicating with said T-pipe, a mouthpiece at one end of the cross member of said T-pipe, said outlet from the vessel and said mouthpiece each opening upwardly in the normal position of said T-pipe, means for rotating said T-pipe to invert said vessel and said mouthpiece, and a piston mounted in the cross member of said T-pipe.

6. In an apparatus for filling fountain pens, the combination with a fixed ink-reservoir, of a movable ink measure provided with an air-vent opening above the level of ink in said reservoir, a flexible supply tube connecting said measure to said reservoir, an outlet tube from said measure, said outlet tube being provided with a mouthpiece for receiving the point of a fountain pen, means for moving said measure to liberate the contents thereof through said outlet tube, and means for forcing the liberated ink into the barrel of said fountain pen.

7. In an apparatus for filling fountain pens, the combination with a casing, of a tubular crank shaft journaled in said casing, a vessel for holding ink mounted upon said shaft within said casing, said vessel having an outlet communicating with one end of said tubular shaft, a mouthpiece at the opposite end of said tubular shaft for receiving the point of a fountain pen, said outlet to the vessel and said mouthpiece each opening upwardly in the normal position of said tubular shaft, means for rotating said tubular crank shaft, and means for forcing ink from said tubular shaft into the barrel of said pen.

8. In an apparatus for filling fountain pens, the combination with a casing, of a tubular crank shaft journaled in said casing, a vessel for holding ink mounted upon said shaft within said casing, said vessel having an outlet communicating with one end of said tubular shaft, a mouthpiece at the opposite end of said tubular shaft for receiving the point of a fountain pen, means for rotating said shaft to invert said vessel, a piston for forcing the ink from said tubular shaft into the barrel of said pen, a cover plate secured upon the outer face of said casing about said piston and pen, said cover plate having an opening therein through which said pen can be inserted or removed when the mechanism is in its initial position and a second opening through which said piston is accessible for manipulation when the mechanism is in its rotated position, and mechanism for controlling said shaft-rotating means.

9. In an apparatus for filling fountain pens, the combination with a casing, of a tubular crank shaft journaled in said casing, a vessel for holding ink mounted upon said shaft within said casing, said vessel having an outlet communicating with one end of said tubular shaft, a mouthpiece at the opposite end of said tubular shaft for receiving the point of a fountain pen, a lever fixed to said crank-shaft within said casing, a dog arranged to lock said lever and shaft against rotation, means extending to the exterior of the casing by which the release of said dog is placed under the control of an operator, means for rotating said crank-shaft and thereby permitting of the flow of ink from said vessel through said tubular shaft, and means for forcing the ink into the barrel of said pen.

10. In an apparatus for filling fountain pens, the combination with a casing, of a swinging ink-measure, a crank-shaft upon which said measure is mounted to rotate, a segmental rack mounted within said casing concentric with said crank-shaft, a lever fixed to said crank-shaft and projecting into proximity to said rack, a dog pivoted upon said lever and normally locking the shaft against rotation, means extending to the exterior of the casing by which the release of said dog is placed under the control of an operator, pawl mechanism carried by said lever and controlling the direction of rotation of said shaft, a piston chamber for receiving ink from said measure in the rotated position of the measure, said piston chamber having a mouthpiece for receiving the point of a fountain pen, and a piston in said piston chamber for forcing ink into the barrel of said pen.

11. In an apparatus for filling fountain pens, the combination with a casing, of a tubular rotary shaft journaled in said casing, an ink-measure mounted within said casing upon the inner end of said tubular shaft and having an outlet communicating with the tubular shaft, a transverse tube mounted upon the outer end of said tubular shaft at a right angle thereto, said tubular shaft having two small openings communicating with said transverse tube, said openings constituting an air vent and an ink outlet, a mouthpiece at one end of said transverse tube for receiving the point of a fountain pen, and a piston reciprocating within said transverse tube.

12. In an apparatus for filling fountain pens, the combination with a tubular crank shaft, a vessel for holding ink mounted upon one end of said shaft, said vessel having an outlet communicating with the tubular shaft, a mouthpiece at the opposite end of said crank shaft for receiving the point of the fountain pen, said outlet from said vessel and said mouthpiece each opening upwardly in the normal position of said crank shaft, a fixed ink-reservoir, a flexible supply-tube connecting said vessel with said reservoir, means for rotating said crank shaft to invert said vessel and said mouthpiece, a piston for pumping the ink from said vessel into the barrel of said pen, and mechanical means for operating said piston.

13. In an apparatus for filling fountain pens, the combination with a reservoir for holding ink, of a movable ink-measure provided with an air-vent opening above the level of ink in said reservoir, a flexible supply-tube connecting said ink-measure to said reservoir, an outlet tube from said ink-measure, said latter tube being provided with a movable mouthpiece adapted to receive the point of a fountain pen, means for inverting said mouthpiece and for also inverting said ink-measure to release the contents thereof into said outlet tube, a piston for forcing the ink from said outlet tube into the barrel of said pen, and mechanism for operating said piston.

14. In an apparatus for filling fountain pens, the combination with a casing, of a movable ink-measure mounted therein, a supply reservoir communicating with said measure, an outlet tube extending from said measure through the wall of said casing and provided with a movable mouthpiece for receiving the point of a pen, means for inverting said mouthpiece and also for inverting said measure to pour the contents thereof into said outlet tube, and mechanism for reciprocating said piston.

In witness whereof, we hereunto subscribe our names this 21st day of May A. D., 1910.

CLARENCE P. BEERS.
FREMONT C. RANDALL.
EDWARD V. WHITON.

Witnesses:
E. V. BARTLETT,
SILAS HAYNER.

---

Copies of this patent may be obtained for five cents each, by addressing the "Commissioner of Patents, Washington, D. C."